(12) United States Patent
Drabbels et al.

(10) Patent No.: US 10,653,156 B2
(45) Date of Patent: May 19, 2020

(54) SHACKLE FOR SUSPENDING VISCERA PACKS OF SLAUGHTERED POULTRY IN A PROCESSING LINE

(71) Applicant: MAREL STORK POULTRY PROCESSING B.V., Boxmeer (NL)

(72) Inventors: Bastiaan Wilhelmina Johannus Elizeus Josephus Drabbels, Vierlingsbeek (NL); Maarten Leonardus Van Oss, Heumen (NL); Robin Henricus Lambertus Cornelissen, Mill (NL); Roger Pierre Hubertus Maria Claessens, Malden (NL); Rudolf Johannes Hubertus Renier Deckers, Wijchen (NL)

(73) Assignee: MAREL STORK POULTRY PROCESSING B.V., Boxmeer (NL)

( * ) Notice: Subject to any disclaimer, the term of this patent is extended or adjusted under 35 U.S.C. 154(b) by 0 days.

(21) Appl. No.: 16/348,642

(22) PCT Filed: Nov. 10, 2017

(86) PCT No.: PCT/NL2017/050730
§ 371 (c)(1),
(2) Date: May 9, 2019

(87) PCT Pub. No.: WO2018/088903
PCT Pub. Date: May 17, 2018

(65) Prior Publication Data
US 2019/0357553 A1    Nov. 28, 2019

(30) Foreign Application Priority Data

Nov. 10, 2016 (NL) .................................. 2017755

(51) Int. Cl.
*A22C 21/00* (2006.01)

(52) U.S. Cl.
CPC ................................ *A22C 21/0007* (2013.01)

(58) Field of Classification Search
CPC .. A22C 21/00; A22C 21/0007; A22C 21/0046
(Continued)

(56) References Cited

U.S. PATENT DOCUMENTS 3,156,947 A * 11/1964 Birchmier .......... A22C 21/0007
452/188
3,507,003 A * 4/1970 Shadley ............. A22C 21/0007
452/183

(Continued)

FOREIGN PATENT DOCUMENTS

DE     3709869 A1    10/1988
EP     0539134 A1    4/1993
(Continued)

OTHER PUBLICATIONS

International Search Report and Written Opinion from PCT Application No. PCT/NL2017/050730, dated Feb. 13, 2018.
(Continued)

*Primary Examiner* — Richard T Price, Jr.
(74) *Attorney, Agent, or Firm* — Workman Nydegger (57) ABSTRACT

A shackle for suspending viscera packs of slaughtered poultry in a processing line comprises a frame; a coupling, connected to the frame, at a first end of the frame; a clamping part, connected to the frame, at a second end of the frame, opposite to the first end of the frame. The clamping part comprises a first clamping element and a second clamping element, wherein the second clamping element is rotatable regarding the first clamping element, between an open position and a closed position. An actuator, such as a rod, is arranged to move, the second clamping element regarding the first actuator. The actuator is moveable between an open position and a closed position. A spring has one end arranged
(Continued)

on the first clamping element, and another end arranged on the second clamping element.

18 Claims, 4 Drawing Sheets

(58) Field of Classification Search
USPC .................................... 452/182, 187, 188
See application file for complete search history.

(56) References Cited

U.S. PATENT DOCUMENTS 3,593,368 A * 7/1971 Cox .................. A22C 21/0007
452/188
6,277,021 B1 * 8/2001 Meyn ................ A22C 21/0007
452/182

FOREIGN PATENT DOCUMENTS

| EP | 0587253 A2 | 3/1994 |
| GB | 2104038 A | 3/1983 |
| WO | 2009020465 A1 | 2/2009 |

OTHER PUBLICATIONS

Netherlands Search Report from NL Application No. 2017755, dated Jul. 17, 2017.

* cited by examiner

SHACKLE FOR SUSPENDING VISCERA PACKS OF SLAUGHTERED POULTRY IN A PROCESSING LINE

BACKGROUND

The present invention relates to a shackle for suspending viscera packs of slaughtered poultry in a processing line, as well as to a clamping element, a spring and an actuator, evidently for use in such shackle.

During the automated processing of poultry various types of operations are performed on the carcass. Normally the poultry is hanged with their legs to shackles or brackets to transport the poultry along a predetermined transport path. Such transport path is usually dictated by an overhead conveyor. Various types of shackle structures and conveyor types for such poultry transportation are known. During transportation of the poultry hanging on the shackles various types of processes can be performed on the poultry carcasses.

One of the processes is the evisceration of the poultry carcasses, during which the viscera pack of the poultry carcass is separated from the carcass. This may then be transported for inspection or further processing on for instance a giblet harvesting machine. The viscera packs may for instance be inspected by a veterinarian, to detect visual indications of disease in the poultry carcass.

SUMMARY

It is an object of the invention to provide a shackle for suspending viscera packs of slaughtered poultry in an automated processing line.

The invention thereto proposes a shackle for suspending viscera packs of slaughtered poultry in a processing line, comprising: a frame; a coupling, connected to the frame, for suspending the shackle from a poultry production line, at a first end of the frame; a clamping part, connected to the frame, for clamping viscera packs, at a second end of the frame, opposite to the first end of the frame, wherein the clamping part comprises a first clamping element and a second clamping element, wherein the second clamping element is movable, in particular rotatable with respect to the first clamping element, between an open position in which viscera packs can be placed between the first and second clamping element and a closed position in which viscera packs are clamped between the first and second clamping elements; an actuator, such as a rod, to move, in particular to rotate, the second clamping element with respect to the first actuator, wherein the actuator is moveable between a first position, in which the first and second clamping elements are in the open position; and a second position in which the first and second clamping elements are in the closed position; and a spring, of which one end is arranged on the first clamping element, and another end is arranged on the second clamping element, for providing a force to be overcome for moving the second clamping element into and/or from the closed position.

The shackle may be used in an automatic processing line of slaughtered poultry, in which the shackle is typically hung from its coupling. This way, the coupling is typically located on top of the shackle. On the other end, on the bottom of a hanging shackle, a clamping part is located in which the viscera pack of a poultry carcass may be clamped. The clamping occurs between two clamping elements, which are moveable between an open position, for insertion of the viscera pack in the clamping part (or release thereof), and a closed position, in which the introduced viscera pack is clamped in place. The movement of the clamping elements is instigated by an actuator, which is movable between a first position, corresponding to the open position of the clamping element, and a second position, corresponding to the closed position of the clamping elements. The spring, which is typically elongated, is located between the first and second clamping elements, such that moving the elements away from each other ultimately requires a force of the spring to be overcome. This force keeps the clamping elements together in the closed position, such that the viscera pack is tightly and securely clamped between the clamping elements when required. This force needs to be overcome to release the viscera pack, or to move the clamping elements towards the open position, such that the viscera pack is not released unintentionally, such that contamination of other parts on the line is prevented.

The coupling and the clamping part of the frame may be provided as separate elements, but may also be integrally formed with the frame at least partially. Integrally forming at least part of the coupling and/or at least part of the clamping part with the frame saves an assembly step in assembling the shackle. With regard to the clamping part, typically only one clamping element may be integrally formed with frame, since the two clamping parts are mutually moveable between the open and closed positions.

The first and second clamping elements may be provided with cut-out portions, which cut-out portions can be aligned at least partially, wherein the actuator is arranged to extend through the aligned cut-out portions. When the actuator extends through the cut-out portions and is moved, the first and second clamping elements are typically moved with respect to each other. This is the result of the need of the cut-out portions to keep aligned at least partially, to accommodate the actuator. The cut-out portions of the first and second clamping elements are thus preferably not overlapping completely, in any mutual orientation position. The actuator thereto preferably has substantially the same thickness as the width of at least one of the cut-out portions. The cut-out portions typically extend in the horizontal plane, when the shackle is suspended substantially vertically from the processing line. The cut-out portions also extend in a substantially vertical plane, in order to produce the cut-out in the clamping elements, whereas this extension is typically limited to the thickness of the clamping element.

The actuator may be arranged to be moveable between one end of the cut-out portion of the first and/or second clamping element and the other end of the cut-out portion of the first and/or second clamping element, and wherein movement of the actuator in the cut-out portion may change the mutual position of the first and second clamping element. The movement of the actuator typically forces the two clamping elements to move with respect to each other, such that the cut-out portions the actuator extends through keep being aligned. By moving the actuator, for instance from outside the shackle, the clamping operation of the shackle may be controlled.

The first clamping element may be provided with a straight, or linear, cut-out portion. Such cut-out portion results in that the actuator, which extends through the cut-out portion of the first clamping element, can make a straight or linear movement in the cut-out portion of the first clamping element. The second clamping element may be provided with a curved, or non-linear, cut-out portion. The actuator also extends through the cut-out portion of the second clamping element. The movement of the actuator in the cut-out portion of the first clamping element is limited to a straight or linear movement. This same movement is not possible in the curved or non-linear cut-out portion of the second clamping element without movement or rotation of the clamping elements with respect to each other. If the first clamping element is considered to be stationary, the second clamping element moves such that the actuator, extending through both a straight and a curved cut-out portion, can keep extending through the aligned parts of the clamping elements.

Alternatively, the cut-out portion of the second clamping element may be arranged at an angle compared to the cut-out portion of the first clamping part, at least in the closed position. This would also result in a mutual movement or rotation of the clamping elements upon movement of the actuator. When the cut-out portion have the described shapes in essentially the horizontal plane, it is preferred to arrange the cut-outs through the clamping elements, typically in the vertical plane, at an angle compared to the vertical. Preferably the angle is chosen such that the actuator is aligned with the cut-out portions when extending through the clamping elements, to reduce wear of the elements when the actuator and clamping elements are mutually moved.

The cut-out portion of the second clamping part may comprises a first straight section at a first end, a second straight section at a second end and a third section, connecting the first and second section, wherein subsequent sections are arranged at obtuse angles. The first straight section at the first end may, in the open position of the clamping part (or the first position of the actuator), be substantially parallel with the straight cut-out portion of the first clamping element. The second straight section of the second end may, in the closed position of the clamping part (or the second position of the actuator), be substantially parallel with the straight cut-out portion of the first clamping element. This parallel orientation of cut-out portions allow the actuator to move slightly in both the first and second clamping element, without mutually moving the elements. Over time the components of the shackle may wear, allowing relative small movements of parts. The parallel orientation of cut-out portions prevent that these small movements cause an unwanted mutual movement of the first and second clamping elements, and thus an unwanted clamping of the shackle. Additionally, the parallel orientation prevents that these small movement cause an unwanted unclamping, or release, of the clamping elements, such that viscera packs are released from the clamping elements when not desired is prevented. The obtuse angles still allow the actuator to move between the straight first and second section of the cut-out portion, and the consequently curved or non-linear section located in between. The sections for instance mutually enclose an angle between 90 and 180 degrees, in particular between 90 and 150 degrees.

The transition between the first straight section and the third section may be smooth, and the transition between the third section and the second section may be sudden. The smooth transition between the first and third section allows a gradual transition from fully open to a closer position. The acute transition between the third and second section results in a sharper transition from and to the fully closed position. Such sharper transition increases the resistance for getting into or from the fully closed position, which further decreases the chances of an unintentional release of viscera packs from the shackle in the closed position.

The actuator may extend substantially vertically, between the frame and the clamping part. Typically, the actuator is arranged to swing from an attachment point on the first end of the frame. This orientation of the actuator allows the actuator to extend through the cut-out portions of the clamping parts, in particular when the cut-out portions extend in the horizontal plane (when suspended from a processing line for instance). It also allows the actuator to extend beyond the clamping part in vertical direction, which leaves a portion of the actuator available to move from outside the shackle. When the actuator swings from an attachment point on the first end of the frame, so from the top side of the frame, the swinging slightly changes the angle with respect to the vertical. When the cut-out portion have the described shapes in essentially the horizontal plane, it is preferred to arrange the cut-outs through the clamping elements at an angle compared to the vertical wherein the angle is chosen such that the actuator is aligned with the cut-out portions when swinging through the clamping elements, to reduce wear of the elements when the actuator and clamping elements are mutually moved.

The first clamping element may formed in one piece with the frame and/or the first clamping element may stationary with respect to the frame. Forming the first clamping element in one piece with the frame saves additional construction steps in producing the shackle, and reduces weak points in the construction. When the first clamping element is formed in one piece with the frame, or is stationary with respect to the frame, the second clamping element needs to be movable, or rotatable, with respect to both the first clamping element and the frame.

One end of the spring may be arranged on the frame, and another end may be arranged on the second clamping element, for providing a force to be overcome for moving the second clamping element into and/or from the closed position. Such configuration of the spring may be especially beneficial if the first clamping element is formed in one piece with the frame or when the first clamping element is stationary. The mutual movement or rotation of the clamping elements between the open and closed position can thus be subjected to the clamping force, irrespective of the precise position of the end of the spring on the stationary part. This arrangement of the spring is for instance instead of the arrangement of the spring, wherein one end is arranged on the first clamping element, and another end is arranged on the second clamping element, and does not require the first clamping element to be formed in one piece with the frame and/or a stationary first clamping element.

Both ends of the spring may be arranged in a plane parallel to a plane defined by the clamping means. When both ends of the spring are located in a plane parallel to the plane of the clamping means, which planes are typically both horizontal, the closing and opening forces on the spring can be used efficiently to overcome the force of the spring. The mutual movement of the clamping elements, typically in a horizontal plane, can thus be transmitted directly to the spring, without a vertical component in the forces.

The second clamping element is for example rotatable about one end of the spring. The second clamping element can thus, for instance, be rotated or moved between the open and closed positions by the actuator, but can also be translated at least slightly upon compression or release of the spring. This translation, in particular under influence of the spring, adds to the clamping force of the clamping part.

The spring may be curved, such that the effective length of the spring is increased. The spring is for instance located substantially in the circumferential direction of the shackle when suspended from a processing line. The spring may extend substantially in the horizontal plane, in the same plane as the cut-out portions of the clamping elements. The spring could for instance be accommodated in the frame by a complementary cut-out in the frame. In a preferred embodiment the spring is secured to the frame and/or the clamping part. In the unexpected case the spring would break or fail otherwise, the spring remains to be held by the shackle, reducing the risk of the part to end up with the poultry carcasses processed using such shackles.

The frame may comprises a curved edge, towards the coupling of the shackle. The curved edge may be curved substantially in the horizontal direction, for instance horizontal when the shackle is suspended from a processing line. The curved edge may be arranged to engage a rotating surface of the processing line. Upon movement of the shackle along the line, and contact of the curved edge and the surface of the processing line, the curved edge walks along the surface of the processing line, which results in a rotation of the shackle. The curved edge may be substantially in the form of an oval. When the curved edge engages a wall part of a production line, for instance under the influence of friction, the curved edge may walks along this wall part, thereby turning or rotating the shackle. Using a curved edge rather than a Malteser-cross for instance, is that the rotation of the shackle is gradual, less abrupt. This means that also the rotational forces on viscera packs hanging from the shackle is gradual, such that these packs do not swing as much. This way, the line can operate at a higher speed compared to traditional lines, while keeping the same margins on swinging of viscera packs, thus increasing the efficiency of the processing line.

The frame, the first and the second clamping elements may be made of plastic, in particular a mouldable plastic. This allows the shackle to be produced through relatively fast and cheap production methods such as injection moulding.

The first and/or second clamping element may be step-shaped. A step-shape according to the invention is for instance formed by a horizontal part which engages the viscera pack in the closed position, another horizontal part which is provided with the cut-out portion to accommodate the actuator, and a vertical part connecting the two horizontal parts. The vertical part allows the clamping portion and the cut-out portion to be distanced from each other, which for instance prevents contamination of the cut-out portions with viscera packs in the clamping portion.

The invention further relates to the second clamping element, the spring and the actuator, evidently for use in a shackle according to the invention. These elements of the shackle can be easily replaced, and are most prone to wear.

BRIEF DESCRIPTION OF THE DRAWINGS

The invention will be further elucidated herein below on the basis of the non-limitative exemplary embodiments shown in the following figures. Herein.

DETAILED DESCRIPTION OF VARIOUS EMBODIMENTS

Figure 1:
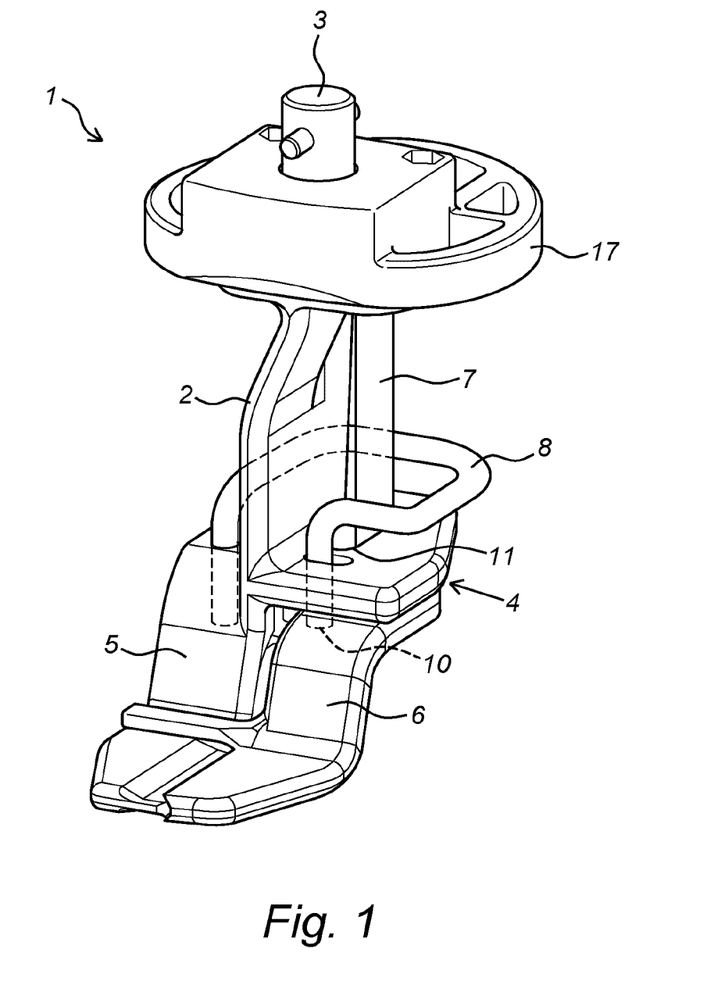
FIG. 1 shows a perspective view of a shackle according to the invention in a closed position.

FIG. 1 shows a shackle (1) for suspending viscera packs of slaughtered poultry in a processing line, comprising a frame (2), a coupling (3), connected to the frame (2) and a clamping part (4), connected to the frame (2). The coupling (3) for suspending the shackle (1) from a poultry production line is located at a first end of the frame (2), and the clamping part (4) for clamping viscera packs is located at a second end of the frame (2), opposite to the first end of the frame (2).

The frame (2), towards the coupling (3), is provided with a curved edge (17), substantially in the form of an oval. When this curved edge (17) engages a wall part of a production line, for instance under the influence of friction, the curved edge (17) walks along this wall part, thereby turning or rotating the shackle (1). Using a curved edge (17) rather than a Malteser-cross for instance, is that the rotation of the shackle (1) is gradual, less abrupt. This means that also the rotational forces on viscera packs hanging from the shackle (1) is gradual, such that these packs do not swing as much. This way, the line can operate at a higher speed compared to traditional lines, while keeping the same margins on swinging of viscera packs, thus increasing the efficiency of the processing line.

The clamping part (4) comprises a first clamping element (5) and a second clamping element (6) which second clamping element (6) is movable, in this case rotatable, with respect to the first clamping element (5), between an open position in which viscera packs can be placed between the clamping part (4) and a closed position in which viscera packs are clamped between the clamping part (4). FIG. 1 shows the closed position. The first clamping element (5) in FIG. 1 is formed in one piece with the frame (2). Both the first (5) and second (6) clamping elements are shown as being step-shaped. The frame (2) may be considered to be the essentially vertically extending part of the shackle (2), whereas the first clamping element (6) is the step-shaped element below this vertically extending part.

The shackle (1) further comprises an actuator (7), shown as a rod (7), to rotate the second clamping element (6) with respect to the first actuator (5). This actuator (7) is moveable between a first position, in which the first (5) and second clamping (6) elements are in the open position and a second position in which the first (5) and second (6) clamping elements are in the closed position. FIG. 1 shows the second position. The actuator (7) in FIG. 1 extends vertically, between the frame (2) at the top side, near the coupling (3), and the clamping part (4). The actuator (7) extends through a cut-out portion (11) of the first clamping element (5) which is integrally formed with the frame (2).

The shackle (1) further comprises a spring (8), of which one end is arranged on the first clamping element (5), and another end is arranged on the second clamping element (6). This spring (8) provides a force to be overcome for moving the second clamping element (6) into or from the closed position. In the shown embodiment of FIG. 1, the second clamping element (6) is rotatable about one end (10) of the spring (8). The spring (8) is curved around the frame (2) in order to increase its effective length. This way, forces and stresses building up in the spring (8) can be distributed over a larger area compared to a straight spring, such that critical forces on the spring (8), and ultimately failure of the spring (8) may be reduced or prevented.

Figure 2:
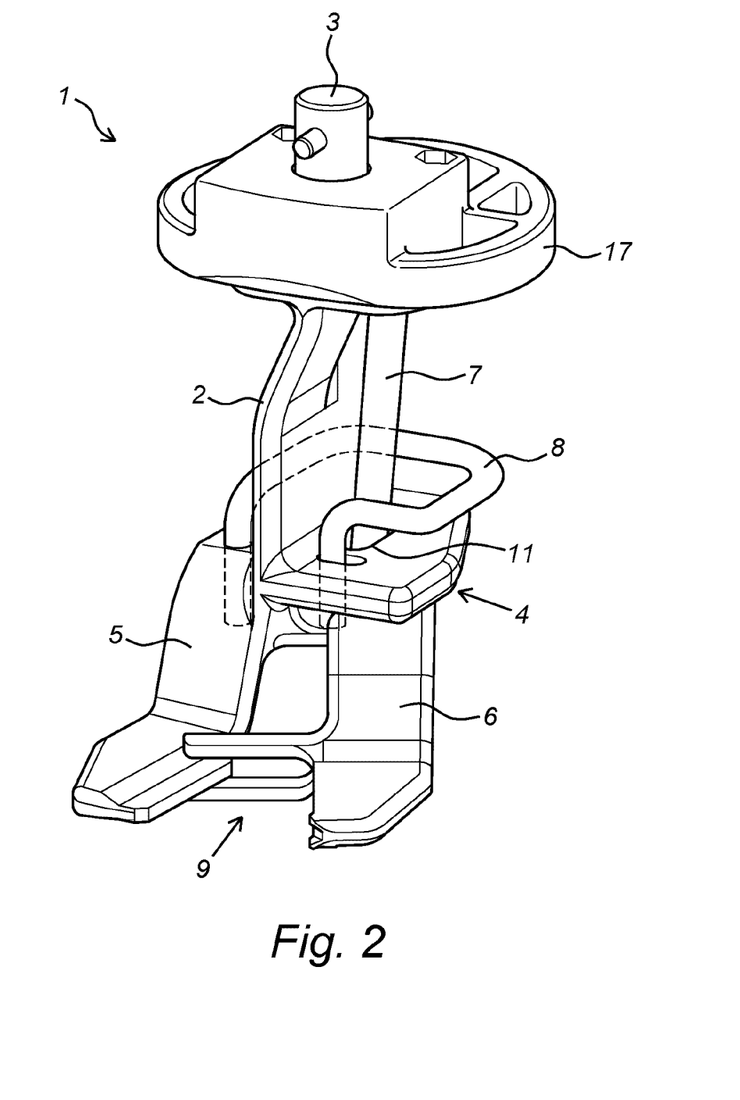
FIG. 2 shows a perspective view of a shackle according to the invention in an open position.

FIG. 2 shows the shackle (1) of FIG. 1, but in the open position. The second clamping element (6) is shown in a rotated fashion compared to FIG. 1, and the actuator (7) is shown in a different, first position, wherein it is positioned differently in the cut-out portion (11) of the first clamping element (5). In this open position of the shackle (1), viscera packs may be placed between the first (5) and second (6) clamping element, through the created opening (9).

Figure 3:
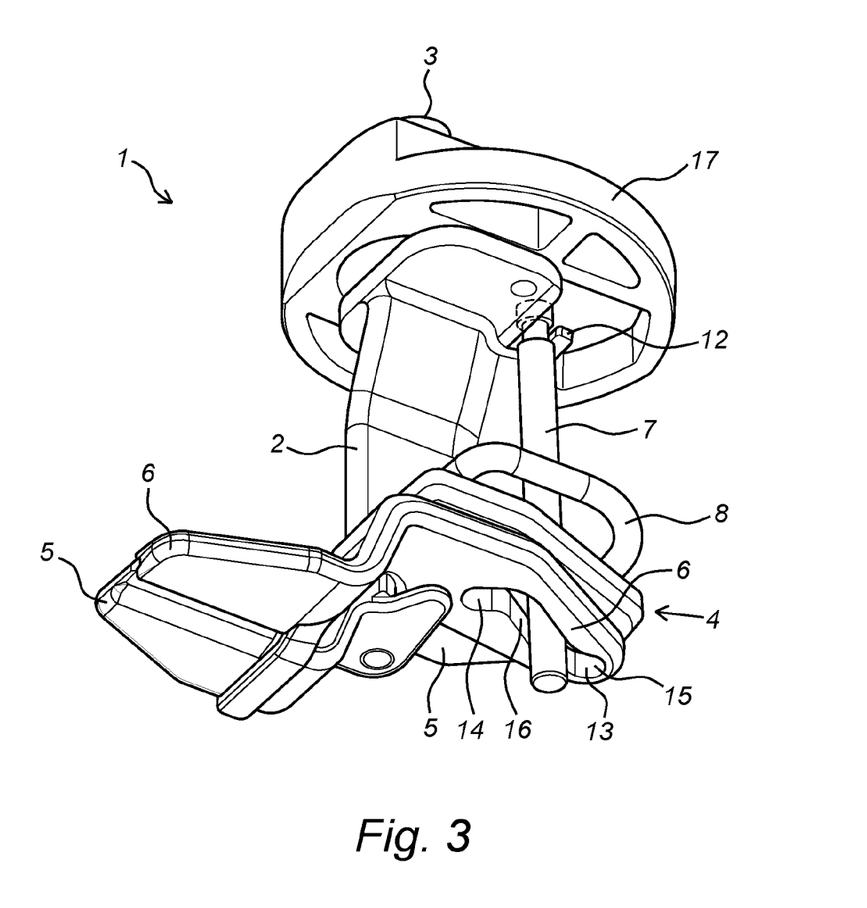
FIG. 3 shows another perspective view of a shackle according to the invention in a closed position.

FIG. 3 shows the shackle (1) of FIG. 1 from another perspective. The actuator (7) in FIG. 1 extends vertically, between the frame (2) at the top side, near the coupling (3), and the clamping part (4), and is suspended from the frame (2), such that it may make a swinging movement from its suspension (12). The perspective view of FIG. 3 also shows a cut-out portion (13) in the second clamping element (6). The actuator (7) also extends through this cut-out portion (13), just like through the cut-out portion (11) of the first clamping element.

The cut-out portion (13) of the second clamping element (6) is curved, somewhat like an S-shape. The cut-out portion (13) comprises a first straight section (14), a second straight section (15) and a third section (16), connecting the straight sections (14, 15) at obtuse angles, angles larger than 90 degrees.

Figure 4:
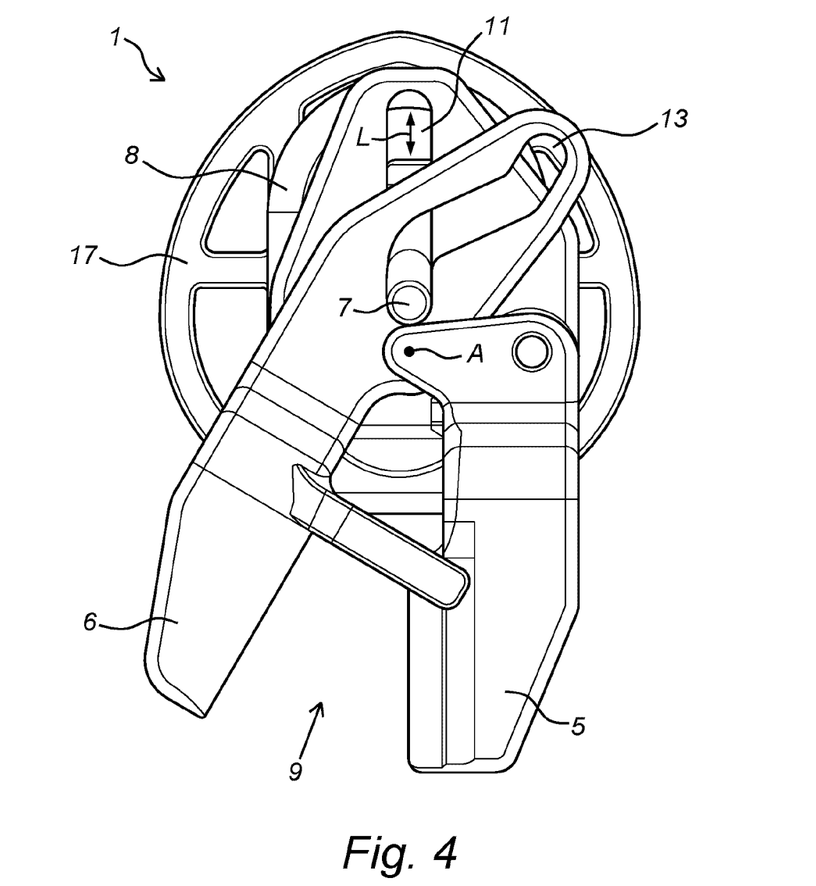
FIG. 4 shows a bottom view of a shackle according to the invention in an open position.

FIG. 4 shows the shackle (1) of the previous figures from below. Both the cut-out portion (11) of the first clamping element (5) and the cut-out portion (13) of the second clamping element (6) are visible in this view, wherein the actuator (7) extends through both portions (11, 13). The cut-out portion (11) of the first clamping element (5) is linear in FIG. 4, such that the actuator can only make a linear movement (L) through the cut-out portion (11). The second clamping element (6) is rotatable, about an axis (A), with respect to the first clamping element (5). When the actuator (7) as shown in FIG. 4 moves up, it encounters a bend in the cut-out portion (13) of the second clamping element (6). Because the actuator (7) can only move in a straight line (L), the second clamping element (6) will rotate about its axis of rotation (A) to keep accommodating the actuator (7), thereby rotating the second clamping element (6) towards a closed position. The actuator (7) thus keeps extending through aligned portions of the cut-out portions (11, 13).

Figure 5:
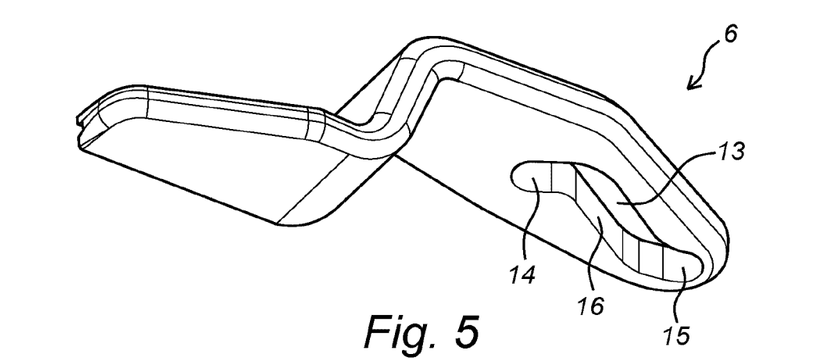
FIG. 5 shows a perspective view of a second clamping element according to the present invention.

FIG. 5 shows a perspective view of a second clamping element (6), which can be used in a shackle (1) according to the previous figures. The element (6) has a step-shape and is provided with a curved cut-out portion (13). This cut-out portion (13) comprises a first straight section (14), a second straight section (15) and a third section (16), connecting the straight sections (14, 15) at obtuse angles, angles larger than 90 degrees. It is also possible that the cut-out portion only has the first straight section (14), wherein the second section is a curved end of the third section (16).

The invention claimed is:

1. A shackle for suspending viscera packs of slaughtered poultry in a processing line, comprising:
    a. a frame;
    b. a coupling, connected to the frame, for suspending the shackle from a poultry production line, at a first end of the frame;
    c. a clamping part, connected to the frame, for clamping viscera packs, at a second end of the frame, opposite to the first end of the frame;
    d. wherein the clamping part comprises a first clamping element and a second clamping element, wherein the second clamping element is movable and rotatable, with respect to the first clamping element, between
        i. an open position in which viscera packs can be placed between the first and second clamping element and
        ii. a closed position in which viscera packs are clamped between the first and second clamping elements
    e. an actuator, such as a rod, to move and rotate, the second clamping element with respect to the first clamping element, wherein the actuator is moveable between
        i. a first position, in which the first and second clamping elements are in the open position; and
        ii. a second position in which the first and second clamping elements are in the closed position;
    f. a spring, of which one end is arranged on the first clamping element, and another end is arranged on the second clamping element, for providing a force to be overcome for moving the second clamping element into and/or from the closed position.

2. The shackle according to claim 1, wherein the first and second clamping elements are provided with cut-out portions, which cut-out portions can be aligned at least partially, and
    wherein the actuator is arranged to extend through the aligned cut-out portions and
    wherein the actuator preferably has substantially the same thickness as the width of at least one of the cut-out portions.

3. The shackle according to claim 2, wherein the first clamping element has a substantially straight or linear cut-out portion, and
    wherein the second clamping element has a substantially curved or non-linear cut-out portion,
    or a cut-out portion at an angle compared to the cut-out portion of the first clamping part.

4. The shackle according to claim 2, wherein the actuator is arranged to be moveable between one end of the cut-out portion of the first and/or second clamping element and the other end of the cut-out portion of the first and/or second clamping element, and
    wherein movement of the actuator in the cut-out portion changes the mutual position of the first and second clamping element.

5. The shackle according to claim 2, wherein the cut-out portion of the second clamping part comprises a first straight section at a first end, a second straight section at a second end and a third section, connecting the first and second section, wherein subsequent sections are arranged at obtuse angles.

6. The shackle according to claim 5, wherein the transition between the first straight section and the third section is smooth, and
    wherein the transition between the third section and the second section is sudden.

7. The shackle according to claim 1, wherein the actuator extends essentially vertically, between the frame and the clamping part.

8. The shackle according to claim 1, wherein the actuator is arranged to swing from an attachment point on the first end of the frame.

9. The shackle according to claim 1, wherein the first clamping element is formed in one piece with the frame and/or
    wherein the first clamping element is stationary with respect to the frame.

10. The shackle according to claim 9, wherein the one end of the spring is arranged on the frame, and another end is arranged on the second clamping element, for providing a force to be overcome for moving the second clamping element into and/or from the closed position.

11. The shackle according to claim 1, wherein both ends of the spring are arranged in a plane parallel to a plane defined by the clamping means.

12. The shackle according to claim 1, wherein the second clamping element is rotatable about one end of the spring.

13. The shackle according to claim 1, wherein the spring is curved, such that the effective length of the spring is increased.

14. The shackle according to claim 1, wherein the frame, the first and the second clamping elements are made of plastic.

15. The shackle according to claim 1, wherein the first and/or second clamping element is step-shaped.

16. A second clamping element, for use in a shackle according to claim 1.

17. An actuator, for use in a shackle according to claim 1.

18. A spring, for use in a shackle according to claim 1.

* * * * *